(12) United States Patent
Kwon et al.

(10) Patent No.: US 11,290,942 B2
(45) Date of Patent: Mar. 29, 2022

(54) SYSTEM AND METHOD FOR INDEPENDENT DOMINATING SET (IDS) BASED ROUTING IN MOBILE AD HOC NETWORKS (MANET)

(71) Applicant: Rockwell Collins, Inc., Cedar Rapids, IA (US)

(72) Inventors: Tj T. Kwon, Marion, IA (US); Ray L. Cross, Cedar Rapids, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/987,671

(22) Filed: Aug. 7, 2020

(65) Prior Publication Data

US 2022/0046516 A1 Feb. 10, 2022

(51) Int. Cl.
| | |
|---|---|
| *H04W 40/32* | (2009.01) |
| *H04W 76/40* | (2018.01) |
| *H04W 40/02* | (2009.01) |
| *H04W 40/24* | (2009.01) |
| *H04W 40/38* | (2009.01) |
| *H04W 84/18* | (2009.01) |

(52) U.S. Cl.
CPC ......... *H04W 40/32* (2013.01); *H04W 40/026* (2013.01); *H04W 40/246* (2013.01); *H04W 40/248* (2013.01); *H04W 40/38* (2013.01); *H04W 76/40* (2018.02); *H04W 84/18* (2013.01)

(58) Field of Classification Search
None
See application file for complete search history.

(56) References Cited

U.S. PATENT DOCUMENTS

| | | |
|---|---|---|
| 4,399,531 A | 8/1983 | Grande et al. |
| 5,835,482 A | 11/1998 | Allen |
| | (Continued) | |

FOREIGN PATENT DOCUMENTS

| | | |
|---|---|---|
| CN | 101330448 B | 12/2010 |
| CN | 101465793 B | 2/2011 |
| | (Continued) | |

OTHER PUBLICATIONS

Extended Search Report for European Application No. 21188737.7 dated Dec. 10, 2021, 8 pages.

(Continued)

*Primary Examiner* — Brian S Roberts
(74) *Attorney, Agent, or Firm* — Suiter Swantz pc llo (57) ABSTRACT

A communications node of a multi-node communications network is disclosed. In embodiments, the communications node includes a communications interface and controller. The controller transitions the clustering status of the communications node to a clusterhead node status. The clusterhead node identifies a cluster of neighboring nodes with which it is in communication by transmitting hello messages identifying the clusterhead node and its status but omitting a one-hop neighbor list. The clusterhead node refines link discovery to the nodes of the multi-node communications network by flooding the network (e.g., via its cluster of neighboring nodes) with routing status messages, which network nodes not part of the dominating set of clusterhead nodes are restricted from sending.

14 Claims, 10 Drawing Sheets

(56) References Cited

U.S. PATENT DOCUMENTS

| | | |
|---|---|---|
| 7,242,671 B2 | 7/2007 | Li et al. |
| 7,633,921 B2 | 12/2009 | Thubert et al. |
| 7,719,989 B2 | 5/2010 | Yau |
| 7,787,450 B1 | 8/2010 | Chan et al. |
| 8,036,224 B2 | 10/2011 | Axelsson et al. |
| 8,218,550 B2 | 7/2012 | Axelsson et al. |
| 8,223,660 B2 | 7/2012 | Allan et al. |
| 8,553,560 B2 | 10/2013 | Axelsson et al. |
| 8,630,291 B2 | 1/2014 | Shaffer et al. |
| 8,717,935 B2 | 5/2014 | Lindem, III et al. |
| 8,867,427 B2 | 10/2014 | Taori et al. |
| 8,913,543 B2 | 12/2014 | Zainaldin |
| 9,179,475 B2 | 11/2015 | Koleszar et al. |
| 9,246,795 B2 | 1/2016 | Madaiah et al. |
| 9,544,162 B2 | 1/2017 | Vasseur et al. |
| 9,628,285 B2 | 4/2017 | Császár |
| 10,484,837 B2 | 11/2019 | Navalekar et al. |
| 10,601,684 B2 | 3/2020 | Hashmi et al. |
| 10,965,584 B1 | 3/2021 | Kwon et al. |
| 10,979,348 B1 | 4/2021 | Kwon et al. |
| 10,999,778 B1 | 5/2021 | Kwon et al. |
| 2002/0018448 A1* | 2/2002 | Amis ............... H04L 45/46 370/255 |
| 2003/0151513 A1* | 8/2003 | Herrmann ........... G08B 25/003 340/573.1 |
| 2004/0246902 A1 | 12/2004 | Weinstein et al. |
| 2006/0010170 A1 | 1/2006 | Lashley et al. |
| 2006/0056421 A1 | 3/2006 | Zaki |
| 2007/0097880 A1 | 5/2007 | Rajsic |
| 2007/0109979 A1 | 5/2007 | Fu et al. |
| 2007/0299950 A1* | 12/2007 | Kulkarni ............. H04L 45/00 709/223 |
| 2008/0107034 A1 | 5/2008 | Jetcheva et al. |
| 2008/0117904 A1 | 5/2008 | Radha et al. |
| 2008/0310325 A1* | 12/2008 | Yang ................. H04W 84/18 370/254 |
| 2009/0290572 A1 | 11/2009 | Gonia et al. |
| 2010/0074101 A1 | 3/2010 | Skalecki et al. |
| 2010/0074141 A1 | 3/2010 | Nguyen |
| 2011/0188378 A1 | 8/2011 | Collins et al. |
| 2013/0100942 A1 | 4/2013 | Rudnick et al. |
| 2013/0195017 A1 | 8/2013 | Jamadagni et al. |
| 2013/0250808 A1 | 9/2013 | Hui et al. |
| 2014/0018097 A1 | 1/2014 | Goldstein |
| 2014/0236483 A1 | 8/2014 | Beaurepaire et al. |
| 2014/0258201 A1 | 9/2014 | Finlow-Bates |
| 2015/0010153 A1 | 1/2015 | Robertson |
| 2015/0222479 A1 | 8/2015 | Kim et al. |
| 2015/0296335 A1 | 10/2015 | Joshi et al. |
| 2015/0326689 A1 | 11/2015 | Leppänen et al. |
| 2016/0150465 A1 | 5/2016 | Jung et al. |
| 2016/0373997 A1 | 12/2016 | Petersen et al. |
| 2017/0111266 A1 | 4/2017 | Ko |
| 2017/0134227 A1 | 5/2017 | Song et al. |
| 2017/0149658 A1 | 5/2017 | Rimhagen et al. |
| 2018/0013665 A1 | 1/2018 | Ko et al. |
| 2018/0098263 A1 | 4/2018 | Luo et al. |
| 2018/0302807 A1 | 10/2018 | Chen et al. |
| 2019/0098625 A1 | 3/2019 | Johnson et al. |
| 2019/0251848 A1* | 8/2019 | Sivanesan ............ H04L 5/0048 |
| 2020/0052997 A1 | 2/2020 | Ramanathan et al. |
| 2020/0092949 A1 | 3/2020 | Donepudi et al. |
| 2020/0196309 A1 | 6/2020 | Amouris |

FOREIGN PATENT DOCUMENTS

| | | |
|---|---|---|
| CN | 101686179 B | 1/2013 |
| CN | 103067286 B | 6/2016 |
| CN | 107645417 A | 1/2018 |
| DE | 102010010935 A1 | 9/2011 |
| EP | 1912392 A2 | 4/2008 |
| GB | 2568122 B | 11/2019 |
| JP | 4290684 B2 | 7/2009 |
| JP | 5164157 B2 | 3/2013 |
| KR | 1020040107702 A | 12/2004 |
| KR | 1020060078814 A | 7/2006 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |

OTHER PUBLICATIONS

Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.

* cited by examiner

602 — Designating, from within a plurality of communications nodes of a multi-node communications network, a dominating set of one or more clusterhead nodes associated with a clusterhead node status

604 — Identifying, via a clusterhead node of the dominating set, a cluster of one or more neighbor nodes communicatively coupled to the clusterhead node by transmitting one or more hello messages uniquely identifying the clusterhead node and the clusterhead node status, the one or more hello messages omitting a neighbor list

606 — Determining at least one link status associated with a route from the clusterhead node to the plurality of communications nodes by transmitting, via the clusterhead node, at least one routing status message to the plurality of communications nodes via the cluster of one or more neighbor nodes

608 — Transitioning the clusterhead node status of the clusterhead node to a node status selected from a gateway node status and a noncritical node status

*FIG. 6*

SYSTEM AND METHOD FOR INDEPENDENT DOMINATING SET (IDS) BASED ROUTING IN MOBILE AD HOC NETWORKS (MANET)

CROSS-REFERENCE TO RELATED APPLICATIONS

This application is related to, and incorporates by reference in its entirety, the following U.S. Patent Applications: Ser. No. 16/369,398 filed Nov. 27, 2019 and entitled SYSTEM AND METHOD FOR ADAPTIVE POSITION-LOCATION INFORMATION EXCHANGES; Ser. No. 16/369,398 filed Mar. 29, 2019 and entitled ZERO-OVERHEAD EFFICIENT FLOODING; Ser. No. 16/537,824 filed Aug. 12, 2019 and entitled FLOODING TO ROUTING; and Ser. No. 16/707,111 filed Dec. 9, 2019 and entitled RELIABLE EFFICIENT FLOODING IN MANET.

TECHNICAL FIELD

The subject matter disclosed herein is directed generally to communications networks and more particularly to mobile ad hoc network (MANET) routing.

BACKGROUND

Mobile ad-hoc networks (MANET; also referred to as, e.g., "mesh networks") are known in the art as quickly deployable, self-configuring wireless networks with no predefined network topology. Each communications node within a MANET is presumed to be able to move freely. Additionally, each communications node within a MANET may be required to forward (relay) data packet traffic. Data packet routing and delivery within a MANET may depend on a number of factors including, but not limited to, the number of communications nodes within the network, communications node proximity and mobility, power requirements, network bandwidth, user traffic requirements, timing requirements, and the like.

Optimized link status routing (OLSR) is a de facto standard for proactive routing among MANET nodes. Under OLSR, nodes may discover their two-hop neighbors (e.g., for any given node N1, one-hop neighbors N2 may be those nodes communicatively coupled with N1 and two-hop neighbors N3 are those nodes communicatively coupled with the one-hop neighbors N2 (e.g., and thus "two hops away" from the node N1 using a one-hop neighbor N2 as a relay) by exchanging hello messages. Hello messages are periodically transmitted by all nodes; each hello message sent by a node N1 may include a list of all one-hop neighbors N2 to the node N1.

OLSR may restrict duplicate retransmissions of broadcast packets by selecting a set of multi-point relays (MPR). For example, MPR nodes collect local link status information and advertise this information via efficient packet flooding. However, the identification of a subset of MPRs capable of reaching every node of the network is an NP-complete set-cover problem which cannot be optimized without global coordination. As the number of selected MPR may be as high as the number of nodes in the MANET, overlapping link advertisements may be significant and link discovery may become increasingly expensive (e.g., in terms of hello overhead as well as routing control overhead) as network density increases.

SUMMARY

A communications node of a mobile ad hoc network (MANET) or other multi-node communications network is disclosed. In embodiments, the node includes a communications interface (e.g., antenna and/or transceiver elements) and a controller capable of designating the clustering status of the communications node as a clusterhead node (e.g., one of a dominating set (DS) of clusterhead nodes so designated throughout the network). The clusterhead node identifies neighboring nodes within its cluster (e.g., within its transmission range) by transmitting hello messages identifying the clusterhead node and its clustering status but omitting a local list of one-hop neighbors to the clusterhead node. The clusterhead node further refines link statuses throughout the network (e.g., from the clusterhead node to other nodes of the network) by transmitting routing status messages via its cluster of neighbor nodes. Only the dominating set of clusterhead nodes is permitted to send routing status messages.

In some embodiments, the communications node has an initial clustering status as a gateway node, a noncritical (ordinary) node, or a clusterhead-ready node, from which the controller transitions the communications node to clusterhead node status.

In some embodiments, the clustering status of the clusterhead node is transitioned away from clusterhead node status, e.g., to gateway node or noncritical node status.

In some embodiments, the communications node is designated as a clusterhead node based on passive clustering procedures or methods.

In some embodiments, the controller transmits hello messages to the neighboring nodes according to packet broadcasting procedures or schemes.

In some embodiments, each hello message transmitted by a communications node includes a unique node identifier and the current clustering status of the sending node, but omits a local list of one-hop neighbors to the sending node.

In some embodiments, routing status messages sent by the clusterhead node include link status advertisements (LSA) including link information for the neighbor nodes to the clusterhead node and distance vector distributions (DVD) messages including link information for communications nodes throughout the network.

A method for independent dominating set based ad hoc network routing within a set of communications nodes is also disclosed. In embodiments, the method includes designating a dominating set (DS) of communications nodes from within a multi-node communications network, each node in the DS having a clusterhead node status. The method includes identifying a cluster of neighboring nodes in communication with each clusterhead node of the DS by transmitting hello messages, each hello message identifying the transmitting clusterhead node and its clusterhead node status but omitting a local list of neighbors to the clusterhead node. The method includes determining a link status from the clusterhead to each node of the network by transmitting, via the clusterhead node, routing status messages including link information via the cluster of neighboring nodes.

In some embodiments, the method includes transitioning a node clustering status to the clusterhead status (e.g., for a clusterhead node of the DS) from a gateway node status or a noncritical node status.

In some embodiments, the method includes transitioning the node clustering status to the clusterhead status via passive clustering procedures.

In some embodiments, the method includes transmitting, via the clusterhead node, hello messages omitting a local list of neighbor nodes to the transmitting node.

In some embodiments, the method includes transmitting, via the clusterhead node, routing status messages to the cluster of neighbor nodes via packet broadcasting procedures.

In some embodiments, the method includes transmitting, via the clusterhead node, link status advertisements (LSA) including link information for neighbor nodes to the clusterhead node.

In some embodiments, the method includes transmitting, via the clusterhead node, distance vector distribution (DVD) messages according to one or more routing protocols, the DVD message including link information for every node of the network.

In some embodiments, the method includes transitioning the node clustering status of the clusterhead node from the clusterhead status to a gateway node status or a noncritical node status.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 1:
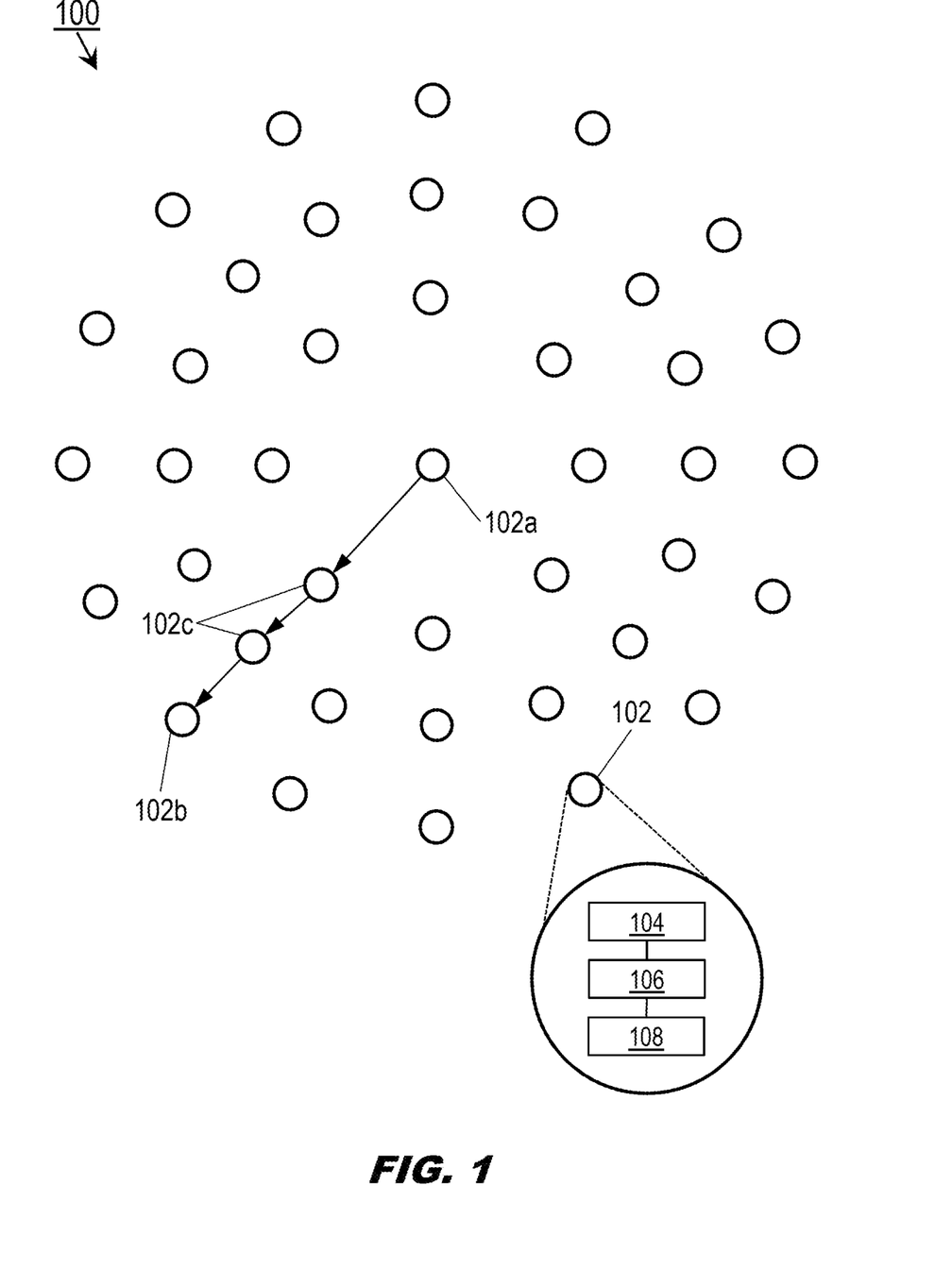
FIG. 1 is a diagrammatic illustration of a mobile ad hoc network (MANET) according to example embodiments of this disclosure.

Referring to FIG. 1, a multi-node communications network 100 is disclosed. The multi-node communications network 100 may include communications nodes 102.

In embodiments, the multi-node communications network 100 may include any multi-node communications network known in the art. For example, the multi-node communications network 100 may include a mobile ad-hoc network (MANET) in which each communications node 102 within the multi-node communications network is able to move freely and independently. Similarly, the one or more communications nodes 102 may include any communications node known in the art which may be communicatively coupled. In this regard, the one or more communications nodes 102 may include any communications node known in the art for transmitting/transceiving data packets. For example, the one or more communications nodes 102 may include, but are not limited to, radios, mobile phones, smart phones, tablets, smart watches, laptops, and the like. In embodiments, each communications node 102 of the multi-node communications network 100 may include, but is not limited to, a respective controller 104 (e.g., control processor), memory 106, and communication interface 108.

The controller 104 provides processing functionality for at least the communications node 102 and can include any number of processors, micro-controllers, circuitry, field programmable gate array (FPGA) or other processing systems, and resident or external memory for storing data, executable code, and other information accessed or generated by the communications node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communications node 102/controller 104, such as software programs and/or code segments, or other data to instruct the controller 104, and possibly other components of the communications node 102, to perform the functionality described herein. Thus, the memory 106 can store data, such as a program of instructions for operating the communications node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communications node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communications node 102 and the controller 104. It should be noted that while the communication interface 108 is described as a component of the communications node 102, one or more components of the communication interface 108 can be implemented as external components communicatively coupled to the communications node 102 via a wired and/or wireless connection. The communications node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communications node 102 may be configured to communicatively couple to additional communication interfaces 108 of additional communications nodes 102 of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the multi-node communications network 100 may determine the shortest route for transmission of a data packet between a source node 102a and a destination node 102b. For example, the source node 102a may not transmit data packets directly to the destination node 102b, but via one or more relay nodes 102c which forward the data packets to the destination node 102b.

In embodiments, the multi-node communications network 100 may, via global collaboration between its participating communications nodes 102, construct the network topology by generating a dominating set (DS), or a subset of all communications nodes within the multi-node communications network. For example, under OLSR every communications node 102, 102a-c may be selected as an MPR node in the worst case (e.g., on a per-node basis without global collaboration), resulting in excessive routing overhead (e.g., due to every MPR node transmitting link status advertisements (LSA)) and/or bandwidth requirements (e.g., due to excessive hello messaging incorporating two-hop neighbor lists).

Figure 2A:
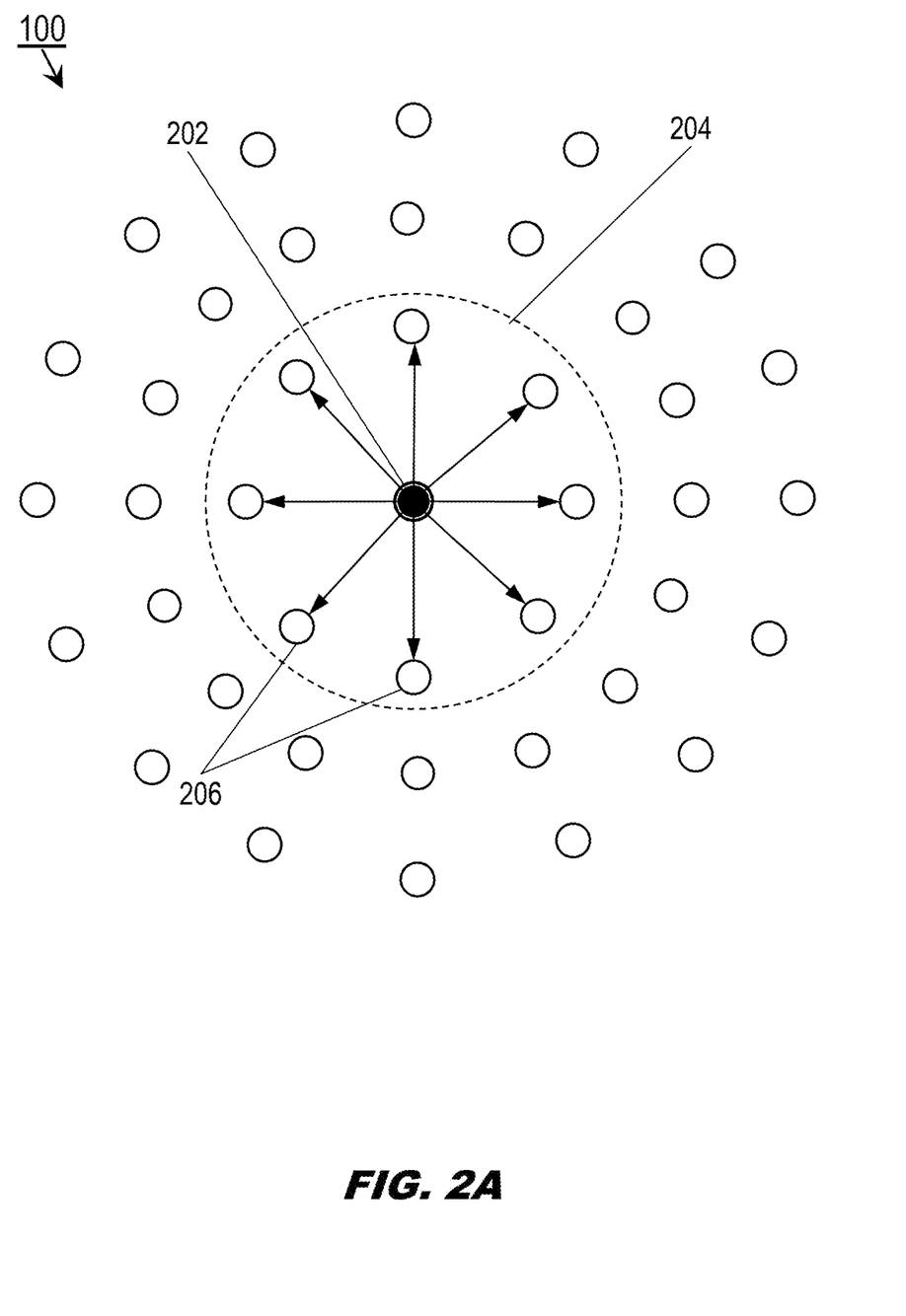
FIGS. 2A and 2B are diagrammatic illustrations of clustering operations of the MANET of FIG. 1.
Figure 2B:
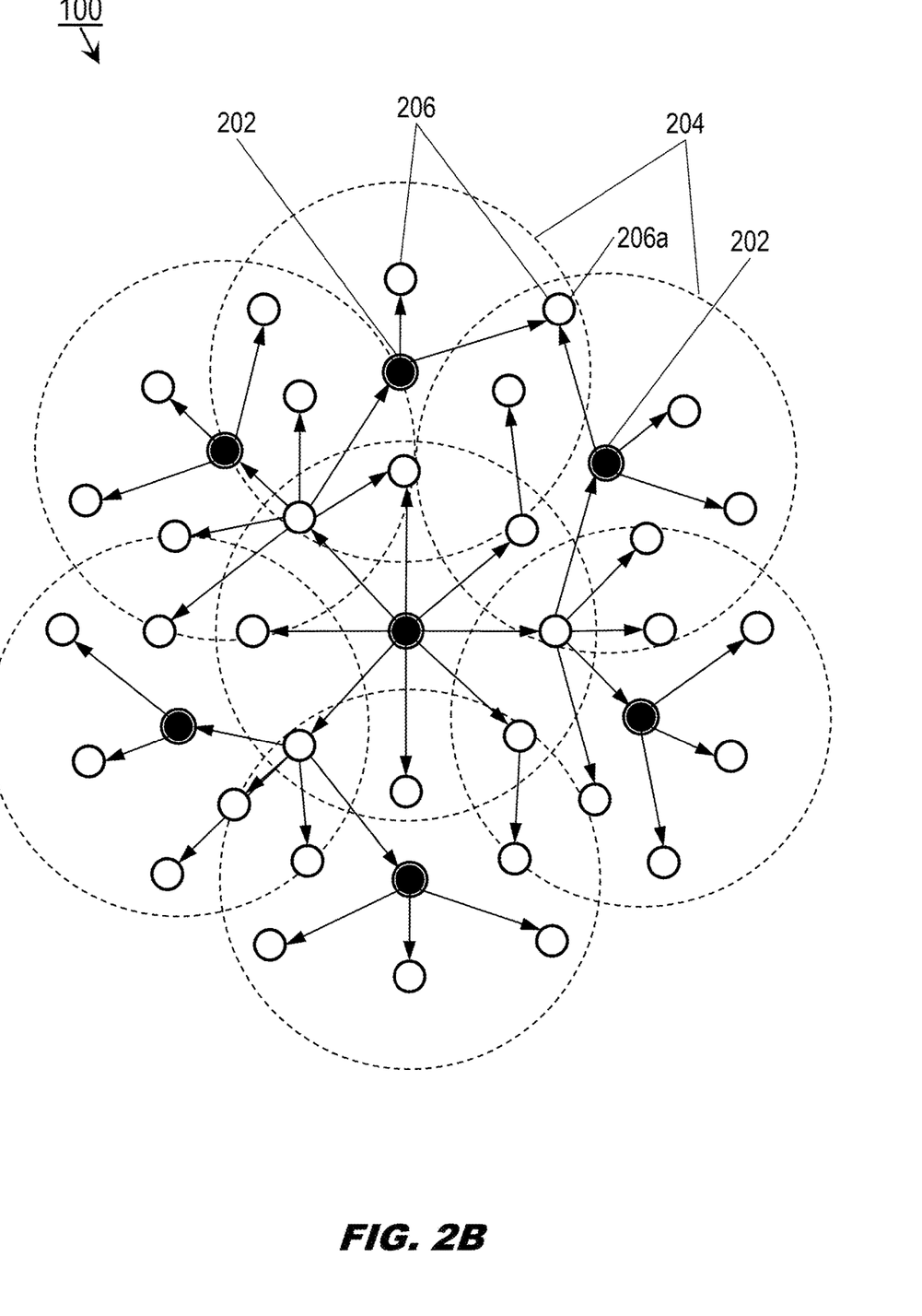

Referring also to FIGS. 2A and 2B, in embodiments the multi-node communications network 100 may organize (e.g., or reorganize) by constructing an independent dominating set (IDS) of communications nodes 102. For example, the DS may include a subset of communications nodes 102 such that 1) the communications nodes comprising the DS are not neighbors to each other, i.e., are not communicatively coupled to each other and 2) the associated link statuses of the communications nodes comprising the DS can reach every communications node of the multi-node communications network 100.

In embodiments, the DS may comprise a set of clusterhead nodes 202 within the multi-node communications network 100, each clusterhead node 202 associated with a cluster 204 of neighbor nodes 206 to which the clusterhead node is directly communicatively connected. The DS may be an independent dominating set (IDS), or the DS having the minimally necessary number of clusterhead nodes 202. For example, based on traffic received from within the multi-node communications network 100, the clusterhead node 202 (e.g., via its controller (104, FIG. 1)) may transition its clustering status (e.g., node status) to clusterhead node status, e.g., from gateway node status or ordinary node status. The state transitions of communications nodes 102 may be determined according to one or more passive clustering procedures and their associated state transition algorithms, e.g., efficient flooding with passive clustering (EFPC), zero overhead efficient flooding (ZOEF), or any other like passive clustering procedures.

In embodiments, the cluster 204 may include any neighbor nodes 206 in direct communication with the clusterhead node 202 or that are two-hop neighbors to each other (e.g., two neighbor nodes 206 in communication with each other via a third node configured to relay communications between the two nodes; this third node is usually the clusterhead node 202 but may also be a gateway node). In some embodiments, the size of the cluster 204 may be determined by the transmission range of the clusterhead node 202.

In embodiments, the designation of the clusterhead node 202 (e.g., in addition to any other clusterhead nodes within the multi-node communications network 100) may be based on received traffic from its neighbor nodes 206. For example, hello messages or other network traffic received from a neighbor node 206 may indicate a status transition in the transmitting neighbor node (which may in turn be driven by, e.g., the addition to or the deletion from the multi-node communications network 100 of a communications node 102). This received status transition, or several received status transitions from multiple neighbor nodes 206, may cause the clusterhead node 202 to change its own node status. In some embodiments, the clusterhead node 202 may initiate a network restructuring and defining of the IDS via an initial flooding to all communications nodes 102 within the multi-node communications network 100 (e.g., according to one or more efficient flooding (EF) procedures for data packet flooding).

Referring in particular to FIG. 2B, the IDS of clusterhead nodes 202 and associated clusters 204 within the multi-node communications network 100 is shown.

In embodiments, each designated clusterhead node 202 of the IDS may identify the neighbor nodes 206 of its associated cluster 204. For example, each clusterhead node 202 may identify its associated neighbor nodes 206 by transmitting adaptive hello messages. Adaptive hello messages may differ from conventional hello messages (e.g., as implemented by OLSR) in that adaptive hello messages may not include a neighbor list, but may only identify the transmitting clusterhead node 202 and its status as a clusterhead node (and, e.g., a timestamp). Upon receiving the adaptive hello message, any neighbor nodes 206 in communication with the clusterhead node 202 may adjust their own local lists of one-hop neighbors (e.g., any communications nodes 102 in addition to the clusterhead node 202 with which the neighbor node is in communication). In embodiments, a neighbor node (206a) within the intersection of two adjacent clusters 204 (and receiving adaptive hello messages and/or routing status messages from two corresponding clusterhead nodes 202) may choose its cluster.

In some embodiments, e.g., if the clusterhead node 202 is flushing an existing clustering structure and reorganizing the multi-node communications network 100 via an initial flooding, each neighbor node 206 may rebuild its own local lists of one-hop neighbors by transmitting adaptive hello messages identifying itself and its node status according to any appropriate packet broadcasting procedures. For example, the clusterhead node 202 may receive adaptive hello messages from its neighbor nodes 206 and adjust its own local list of one-hop neighbors (e.g., if the more recent neighbor node information in the adaptive hello message is different from that currently indicated by the local list).

In embodiments, in the event of a network construction or reorganization, any neighbor nodes 206 not designated as clusterhead nodes 202 may have an initial clustering status as gateway nodes. For example, clusterhead nodes 202 and gateway nodes may relay any received routing status messages to one-hop neighbors in their local lists (e.g., after having determined that the routing status message has not already been relayed once). In some embodiments, the use of single-identifier adaptive hello messages without neighbor lists may result in significantly reduced bandwidth requirements (for example, the total bytes required may increase on a linear rather than exponential basis as the number of neighbor nodes increases). In some embodiments, communications nodes may have other initial clustering statuses, e.g., as noncritical or ordinary nodes, or as clusterhead-ready nodes designated as clusterhead nodes 202 upon successful transmission of a routing status message, as described below.

In embodiments, once the IDS of clusterhead nodes 202 and corresponding clusters 204 have been identified, the clusterhead nodes 202 may continue to refine link discoveries, e.g., as clustering statuses and routing entries expire throughout the multi-node communications network 100.

For example, each clusterhead node 202 may flood the multi-node communications network 100 with routing status messages (e.g., link status advertisements (LSAs; also, topology control (TC)) transmitted to its neighbor nodes 206. The neighbor nodes 206 may relay received LSAs to their own one-hop neighbors after updating their own local lists according to fresh link status information (e.g., if the neighbor nodes are gateway nodes), which in turn may propagate the LSAs to every communications node 102 of the multi-node communications network 100. For example, an LSA transmitted by a clusterhead node 202 may include node identifiers and node statuses for each of its neighbor nodes 206, allowing each receiving communications node 102 to update its local lists accordingly.

In some embodiments, the clusterhead nodes 202 may flood the multi-node communications network 100 with distance vector distribution (DVD) messages instead of LSAs. For example, DVD messages may include routing table information for every communications node 102 of the multi-node communications network 100, e.g., maximum hop counts, actual hop distances of each communications node from the source (e.g., the transmitting clusterhead node 202), next hops for any shortest routes to a destination communications node (a "next hop" may refer to, e.g., any communications node relaying a data packet to the destination).

Figure 2C:
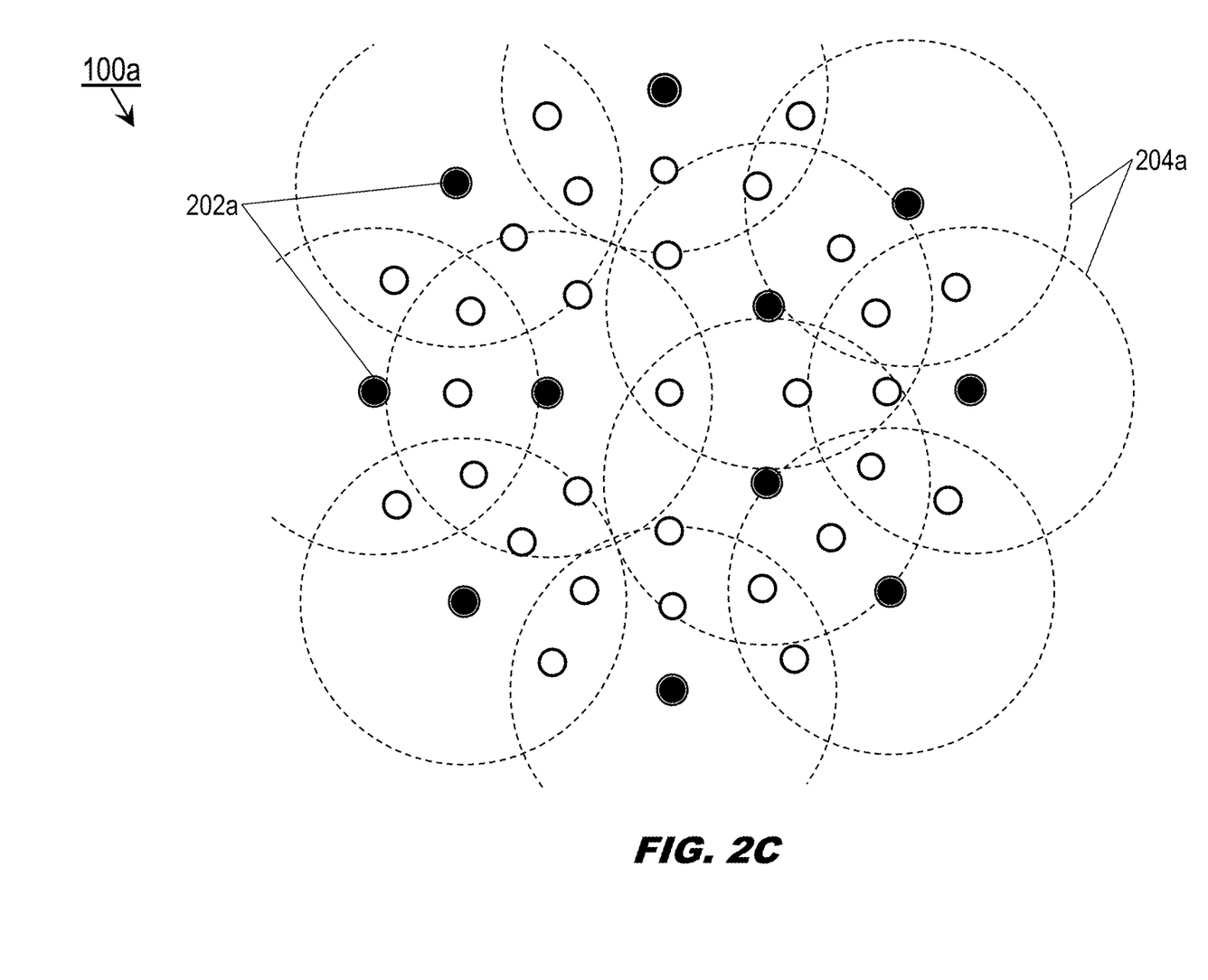
FIG. 2C is a diagrammatic illustration of a worst-case clustering implementation of the MANET of FIG. 1.

In embodiments, by restricting the source of routing status messages (e.g., LSAs, DVDs) to only the IDS, i.e. the independent dominating set of clusterhead nodes 202 (e.g., the dominating set having the minimally necessary number of clusterhead nodes), routing overhead may be significantly reduced compared to MPR implementations. For example, referring to FIG. 2C, the multi-node communications network 100a may be implemented and may function similarly to the multi-node communications network 100 of FIGS. 1 through 2B, except that the multi-node communications network 100a may represent a worst-case clustering implementation of the dominating set (DS) of clusterhead nodes 202a and corresponding clusters 204a, e.g., over the set of 41 communications nodes 102 comprising the multi-node communications network 100. For example, the multi-node communications network 100a may include a DS of 11 clusterhead nodes 204a and, accordingly, 11 LSAs. However, it should be noted that the best case implementation of OLSR over the multi-node communications network 100 provides for 12 MPR nodes and, accordingly, 12 LSAs; even the worst-case DS implementation of the multi-node communications network 100a would reduce routing overhead (for example, the worst-case MPR implementation selects every communications node 102 as an MPR node, resulting in 41 LSAs and a significant jump in routing overhead.

Figure 2D:
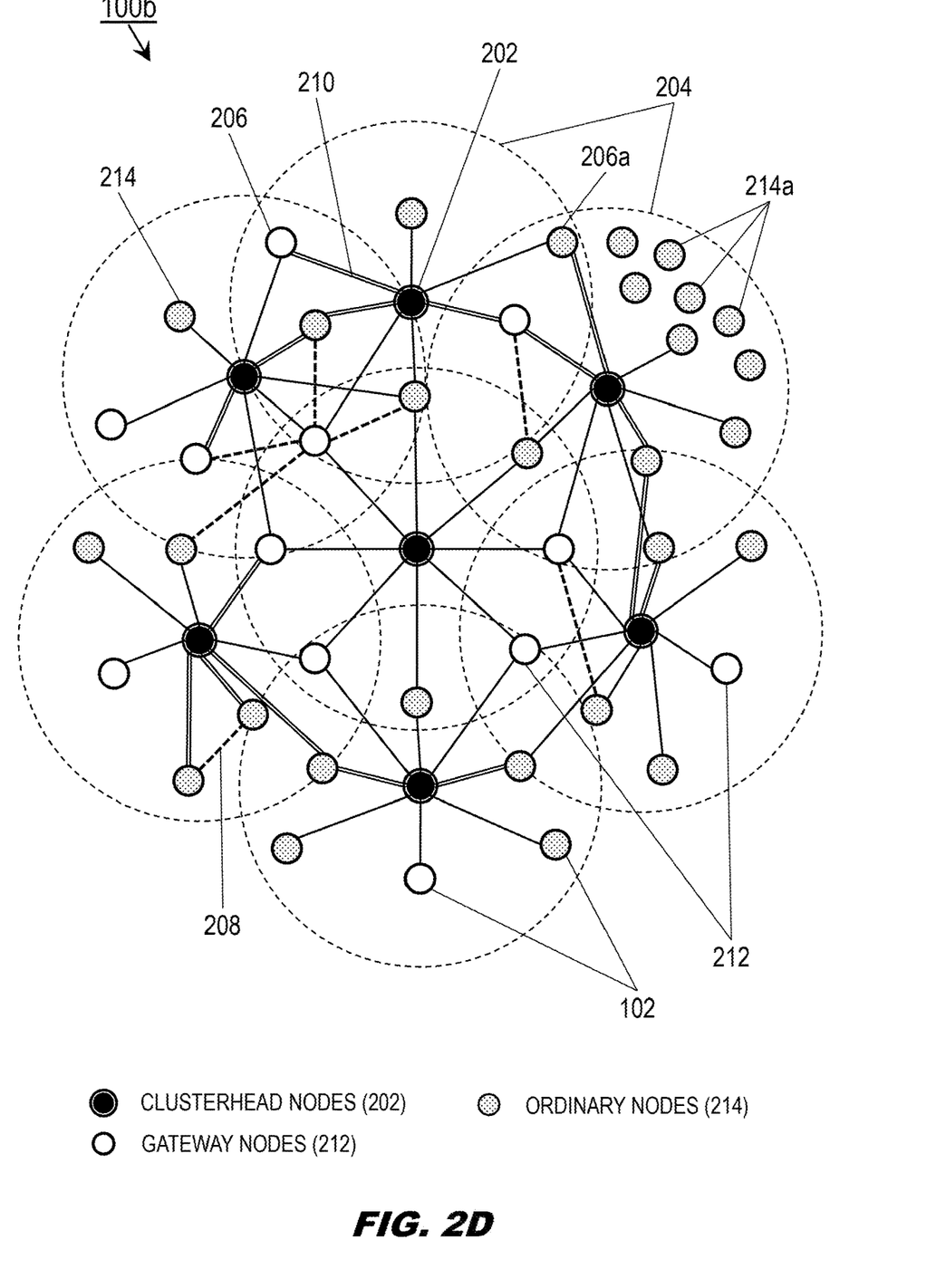
FIGS. 2D and 2E are diagrammatic illustrations of link discovery operations of the MANET of FIG. 1.

Referring to FIG. 2D, the multi-node communications network 100b may be implemented and may function similarly to the multi-node communications network 100 of FIG. 2B, except that the communications nodes 102 of the multi-node communications network 100 may continue to revise link statuses as the routing status messages (or, e.g., additional network traffic) propagate through the multi-node communications network.

In embodiments, each communications node 102 of the multi-node communications network 100b not designated as a clusterhead node 202 may have an initial node status as a gateway node but may transition from that status as the network reorganization resolves. For example, based on updated link information, some communications links may be removed (208) from the multi-node communications network 100b while other new communications links are established (210) between neighbor nodes 206 (e.g., as shorter routes and/or lower hop counts are discovered). In some embodiments, a neighbor node 206a may overlap between two adjacent clusters 204, connected to and receiving traffic as a neighbor node to two clusterhead nodes 202.

In some embodiments, the multi-node communications network 100b may further reduce overhead by transitioning some critical nodes (e.g., clusterhead nodes 202 and gateway nodes 212) to noncritical ordinary nodes 214, which may not relay received network traffic (for example, gateway nodes with no downstream nodes may transition to ordinary nodes). For example, node/clustering status transitions may be based on received status transitions from neighbor nodes, and/or respectively obsolete/removed and new communications links (208, 210) within the multi-node communications network. In embodiments, the multi-node communications network 100b may resolve itself (e.g., via continued link status renewal and/or link refinement) to the extent that vast numbers of additional ordinary nodes 214a may be added to any cluster 204 without significantly affecting routing overhead.

Figure 2E:
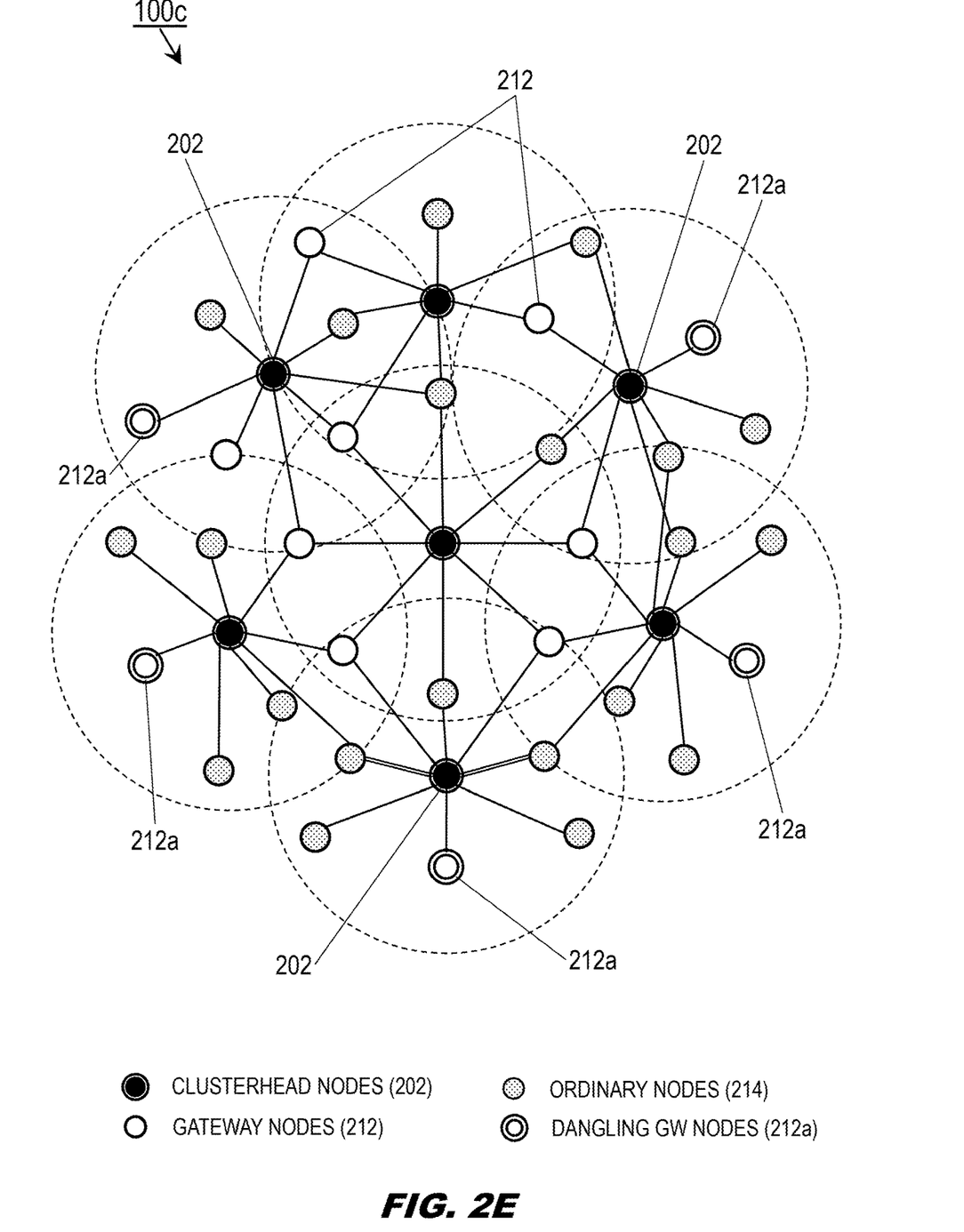

Referring now to FIG. 2E, the multi-node communications network 100c may be implemented and may function similarly to the multi-node communications network 100b, except that the multi-node communications network 100c may further reduce overhead by removing dangling critical nodes. For example, the multi-node communications network 100c may include 19 critical nodes (e.g., 7 clusterhead nodes 202 and 12 gateway nodes 212. However, some gateway nodes 212a may hear (e.g., be in communication with, receive data packets from) only one clusterhead node 202. In embodiments, by removing these "dangling" gateway nodes 212a (e.g., via transitioning to ordinary/noncritical node status 214), the 19 critical nodes may be reduced to 14 (7 clusterhead nodes 202 and 7 gateway nodes 212), further reducing the number of routing status messages relaying through the multi-node communications network 100c.

Figure 3:
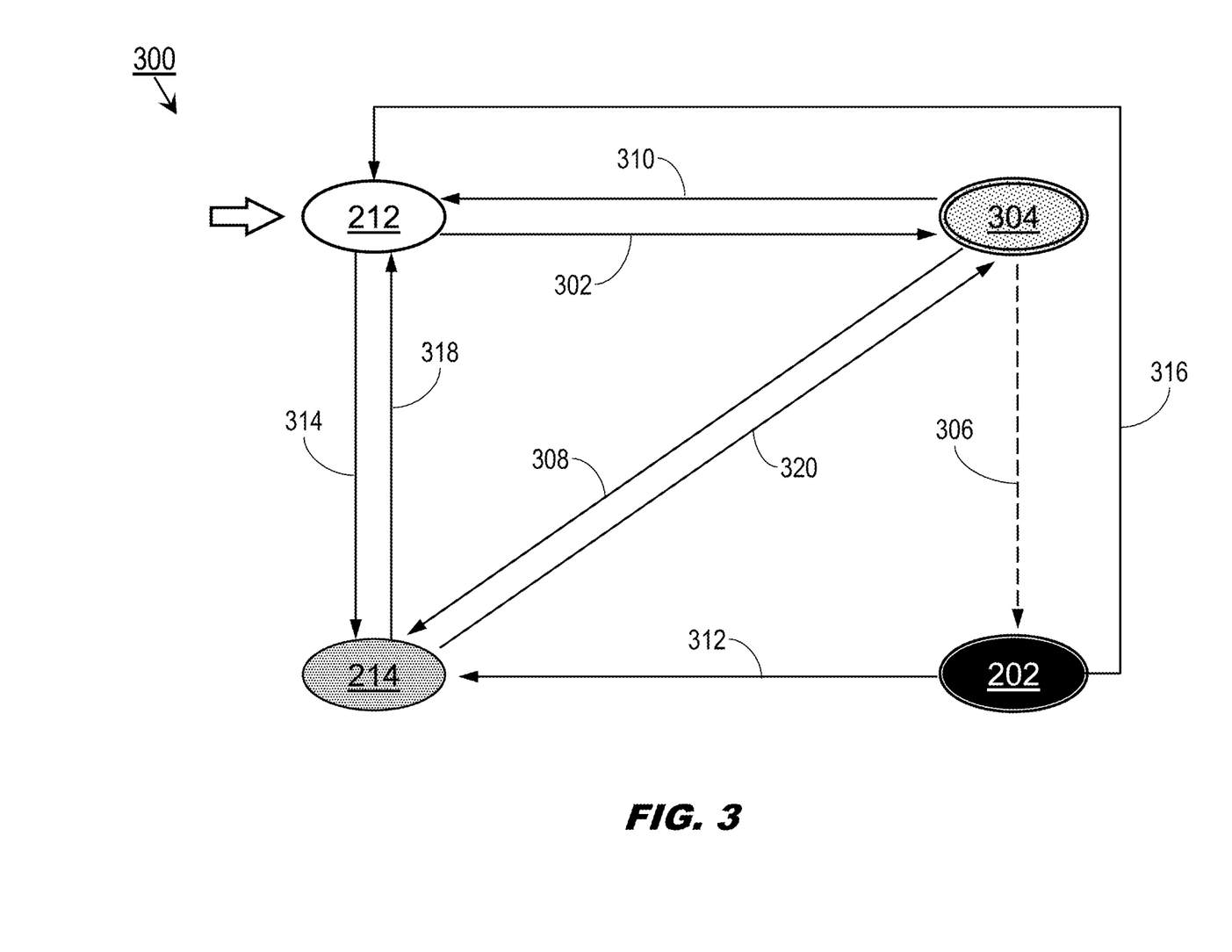
FIG. 3 is a state transition diagram for the MANET of FIG. 1.

Referring to FIG. 3, a status transition diagram 300 of the multi-node communications network 100 of FIG. 1 is shown.

In embodiments, each communications node (102, FIG. 1) of the multi-node communications network 100 may have as its initial node status (e.g., clustering status) a gateway node (212) status and may identify their node status as a gateway node in any relayed transmissions. As new link information is received via adaptive hello messages and/or routing status messages, the clustering status of a communications node 102 may transition to a different node status. For example, if a gateway node 212 is not currently hearing from (e.g., in communication with) a clusterhead node 202, the gateway node may transition (302) to clusterhead-ready status (304). A clusterhead-ready node 304 may designate itself (306) as a clusterhead node 202 upon successful transmission of, e.g., an adaptive hello message or other applicable data packet. However, the clusterhead-ready node 304 may alternatively transition (308) to ordinary node status (214), e.g., if the clusterhead-ready node receives a data packet from a clusterhead node 202 and the following equation applies:

$$GW < \alpha^*(CH) + \beta \quad [1]$$

where GW is the current number of neighboring gateway nodes 212 within the multi-node communications network 100, CH is the current number of neighboring clusterhead nodes 202 within the multi-node communications network 100, and α, β are gateway redundancy factors manually or automatically adjustable to control the number and density of gateway nodes (and therefore number of ordinary/non-critical nodes) within the multi-node communications network 100. Although the examples provided herein provide for gateway redundancy factors which are equal (e.g., α=β=1), it is noted herein that the gateway redundancy factors α, β need not be equal. Adjusting the gateway redundancy factors α, β may alter the ratio of gateway nodes 212 to ordinary nodes 214, which may affect the density of data transmission throughout the multi-node communications network 100. By adjusting the ratio of gateway nodes 212 to ordinary nodes 214 within the multi-node communications network 100, the network may be tailored according to a number of factors including, but not limited to, importance of data delivery, delay requirements, bandwidth requirements, number of communications nodes 102, density of communications nodes 102, and the like.

In embodiments, the clusterhead-ready node 304 may transition (310) back to a gateway node 212, e.g., if the clusterhead-ready node is inactive and equation [1] above applies.

In embodiments, a clusterhead node 202 may transition (312) to an ordinary node 214 if the clusterhead node receives a data packet from another clusterhead node and the following equation applies:

$$GW \geq \alpha^*(CH) + \beta \quad [2]$$

with GW, CH, α, β as in equation [1] above. Similarly, a gateway node (212) may transition (314) to an ordinary node 214 if equation [2] above applies.

In some embodiments, if the clusterhead node 202 remains inactive (e.g., for at least a predetermined time-out period) or receives a data packet from another clusterhead node and equation [1] applies, the clusterhead node may transition (316) to gateway node status (212).

In embodiments, if an ordinary node 214 remains inactive (e.g., for at least the time-out period) or receives a data packet from a clusterhead node 202 and equation (1) applies, the ordinary node may transition (318) to gateway node status (212). Similarly, in the absence of clusterhead nodes 202 (CH=0), an ordinary node 214 may transition (320) to clusterhead-ready status (304).

In some embodiments, the multi-node communications network 100 may provide for other node statuses and/or other algorithms or rules regulating transitions between these statuses, e.g., as provided for by EFPC, ZOEF, or any other appropriate efficient flooding and/or passive clustering schemes utilized by the multi-node communications network 100 (for example, as described in greater detail by related application Ser. No. 16/369,398 incorporated herein by reference in its entirety).

Figure 4A:
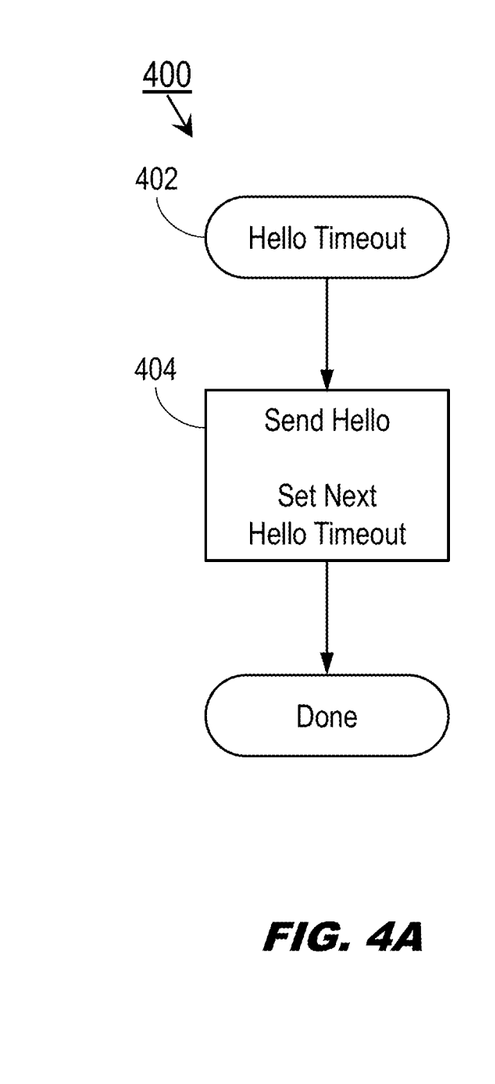
FIGS. 4A through 4C are process flow diagrams illustrating hello operations of the MANET of FIG. 1.

Referring to FIG. 4A, the procedures 400, 410 and 420 are disclosed. The procedure 400, 410 and 420 may be implemented by any communications node (102, FIG. 1) of the multi-node communications network 100 (e.g., whether the communications node is a clusterhead node (202, FIG. 2D), gateway node (212, FIG. 2D), or ordinary node (214, FIG. 2D)).

At the step 402, a predetermined hello timeout (which may be variable) expires.

At the step 404, an adaptive hello message is automatically sent by the communications node 102 identifying a unique ID of the transmitting node as well as the current node status (e.g., clustering status) of the transmitting node, but omitting a neighbor list (e.g., a local list of one-hop neighbor nodes to the transmitting node). When the adaptive hello message is successfully transmitted, a hello timeout restarts (e.g., begins counting down to expiration and transmission of the next hello message).

Figure 4B:
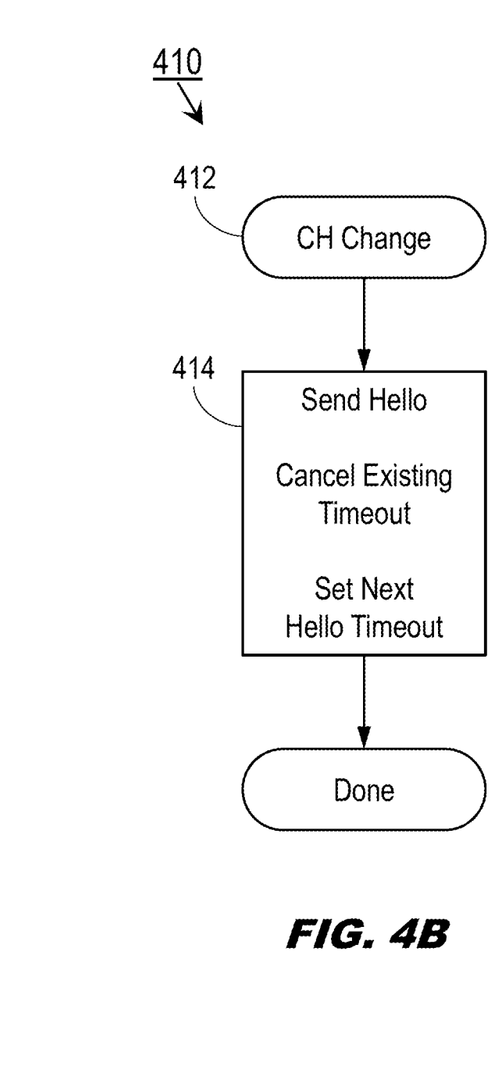

Referring to FIG. 4B, a procedure 410 is disclosed and may include the steps 412 and 414.

At the step 412, a clusterhead node 202 resigns, e.g., changes its node status to gateway node 212, ordinary node (214, FIG. 3), or some other clustering status, e.g., per the status transition diagram 300 of FIG. 3 or as provided for by any appropriate packet flooding and/or passive clustering schemes in use by the multi-node communications network 100.

At the step 414, when the change in clusterhead node status is detected (e.g., via received hello message from the resigning clusterhead node), the receiving clusterhead node 202 or gateway node 212 (e.g., or clusterhead-ready node (304, FIG. 3)) may automatically send a hello message, cancel its current hello timeout in progress, and reset a new hello timeout (e.g., counting down from the automatic transmission of the hello message). In embodiments, to avoid a surge of hello messages from nodes notified of the change, the receiving node transmitting the hello message may introduce a brief random delay before its hello message transmission. In some embodiments, the departure from the multi-node communications network 100 of a clusterhead node 202, or the merger of two or more clusterhead nodes 202 (e.g., when a clusterhead node moves within the cluster (204, FIG. 2D) of, or within the transmission range of, another clusterhead node), may similarly trigger an automatic hello message without waiting for the current hello timeout to expire.

Figure 4C:
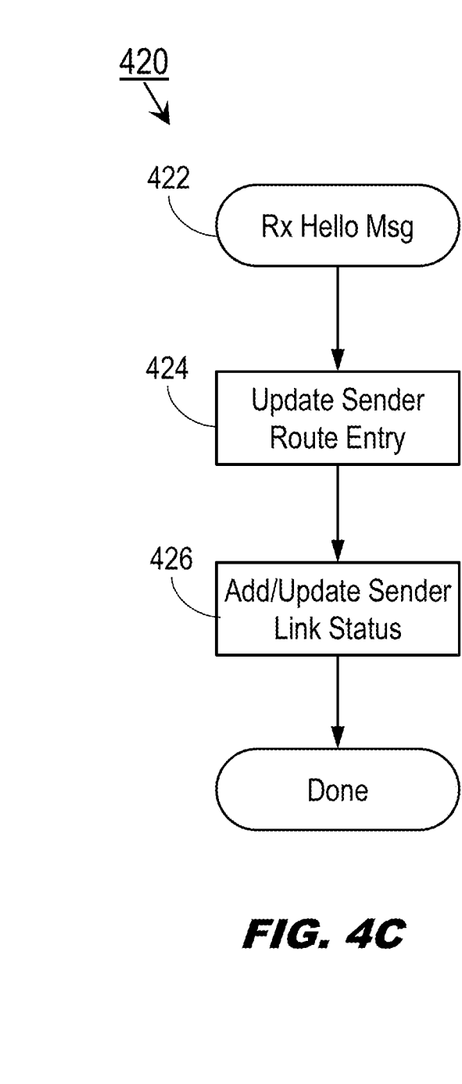

Referring to FIG. 4C, a procedure 420 is disclosed. The procedure 420 may be implemented by any communications node (102, FIG. 1) of the multi-node communications network 100 (e.g., irrespective of clustering status) and may include the steps 422, 424, and 426.

At the step 422, the communications node 102 receives a hello message from a sender node (e.g., a one-hop neighbor node (206, FIG. 2D) of the receiving communications node).

At the step 424, the receiving communications node 102 updates the routing entry in its local list corresponding to the sender node (e.g., to reflect a change in the clustering status of the sender node).

At the step 426, the communications node 102 updates the link status of the sender node in the local list.

Figure 5A:
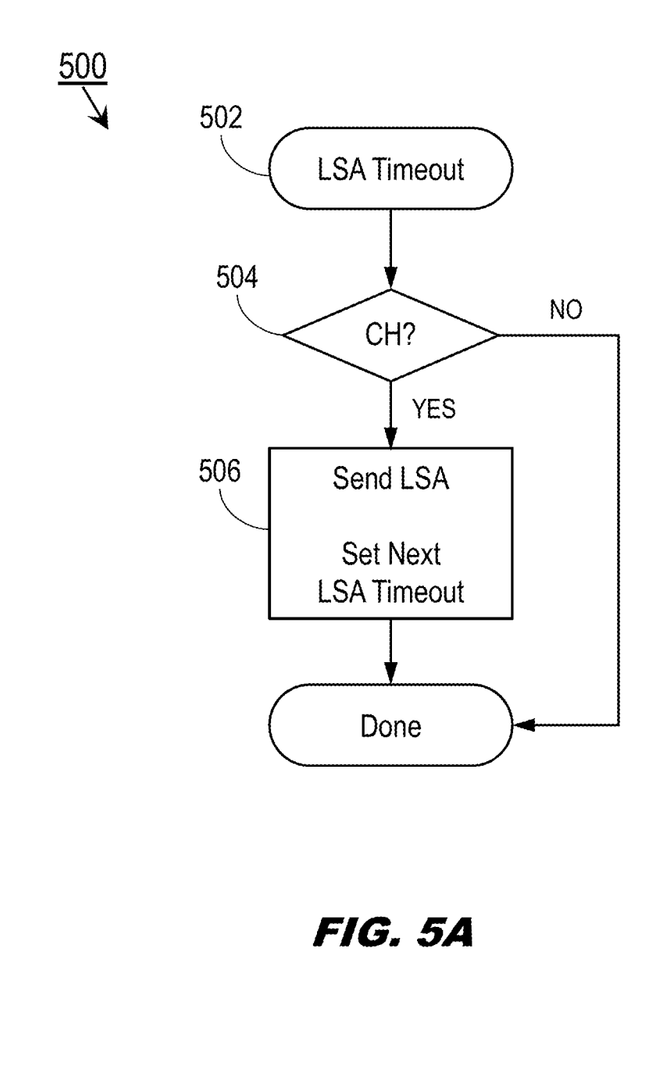
FIGS. 5A and 5B are process flow diagrams illustrating link status advertisement (LSA) operations of the MANET of FIG. 1.

Referring to FIG. 5A, a procedure 500 for routing status message transmission (e.g., whether the routing status message is a link status advertisement (LSA) or a distance vector distribution (DVD)) is disclosed. The procedure 500 may be implemented by a communications node (102, FIG. 1) of the multi-node communications network (100, FIG. 1) (whether the communications node is a clusterhead node (202, FIG. 2D), a gateway node (212, FIG. 2D) or an ordinary node (214, FIG. 2D)) and may include the steps 502, 504, 506.

At the step 502, a predetermined LSA/DVD timeout expires.

At the step 506, if the communications node is a clusterhead node 202 (step 504), the clusterhead node 202 transmits a fresh routing status message (e.g., to its neighbor nodes (206, FIG. 2D)) and resets its LSA/DVD timeout (e.g., counting down to the next routing status message transmission).

In embodiments, each communication node 102 of the multi-node communication network 100 may be configured to implement data packet bookkeeping in order to facilitate packet flooding without infinite retransmissions. For example, each communication node 102 may be configured to add a unique identifier (e.g., MAC address, IP address, and the like) to the header of the routing status message upon relaying the routing status message in order to indicate the routing status message was transmitted through the respective communication node 102. In this regard, a routing status message arriving at a particular communication node (102*b*, FIG. 1) may include identifying data (e.g., unique identifiers) in the header of the routing status message indicating the number of communication nodes (102*c*, FIG. 1) each respective routing status message was transmitted through from the source node (102*a*, FIG. 1) to the respective (e.g., destination) communication node 102*b* (e.g., a "hop count"). In embodiments, the controller 104 of each communication node 102, 102*a-c* is configured to identify a time-stamp of each received and/or transmitted routing status message or data packet and store the time-stamps in memory 106.

Furthermore, the controller 104 of each communication node 102 may be configured to store routing tables to various other communication nodes 102 in memory 106. For the purposes of the present disclosure, the term "routing table" may be used to refer to a soft-state local list of neighboring nodes communicatively coupled to the respective communication node 102 "upstream" and "downstream" from the communication node (e.g., nodes 102*b-c* downstream from node 102*a*). Routing tables may be constructed and stored in memory of each communication node 102, 102*a-c* based on unique identifiers and hop counts stored in the header of received data packets.

Figure 5B:
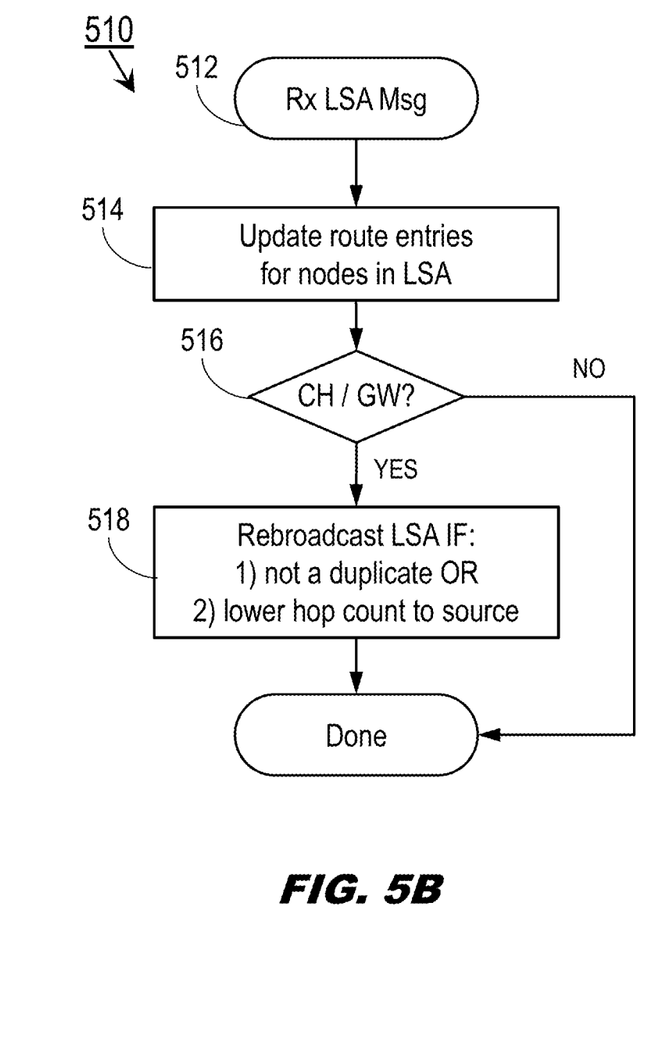

Referring to FIG. 5B, a procedure 510 for routing status message reception and consumption is disclosed. The procedure 510 may be implemented by communications nodes 102 of the multi-node communications network 100 and may include the steps 512, 514, 516, and 518.

At the step 512, the communications node 102 receives a routing status message (e.g., LSA, DVD).

At the step 518, if the receiving communications node 102 is a clusterhead node 202 or a gateway node 212 (step 516), the communications node 102 relays the routing status message if the routing status message is not a duplicate message (e.g., if another critical node has already relayed the routing status message), or if the routing status message provides for a lower hop count to the source node (e.g., the clusterhead node 202 from which the routing status message originated) than currently reflected by the local list of the communications node.

Figure 6:
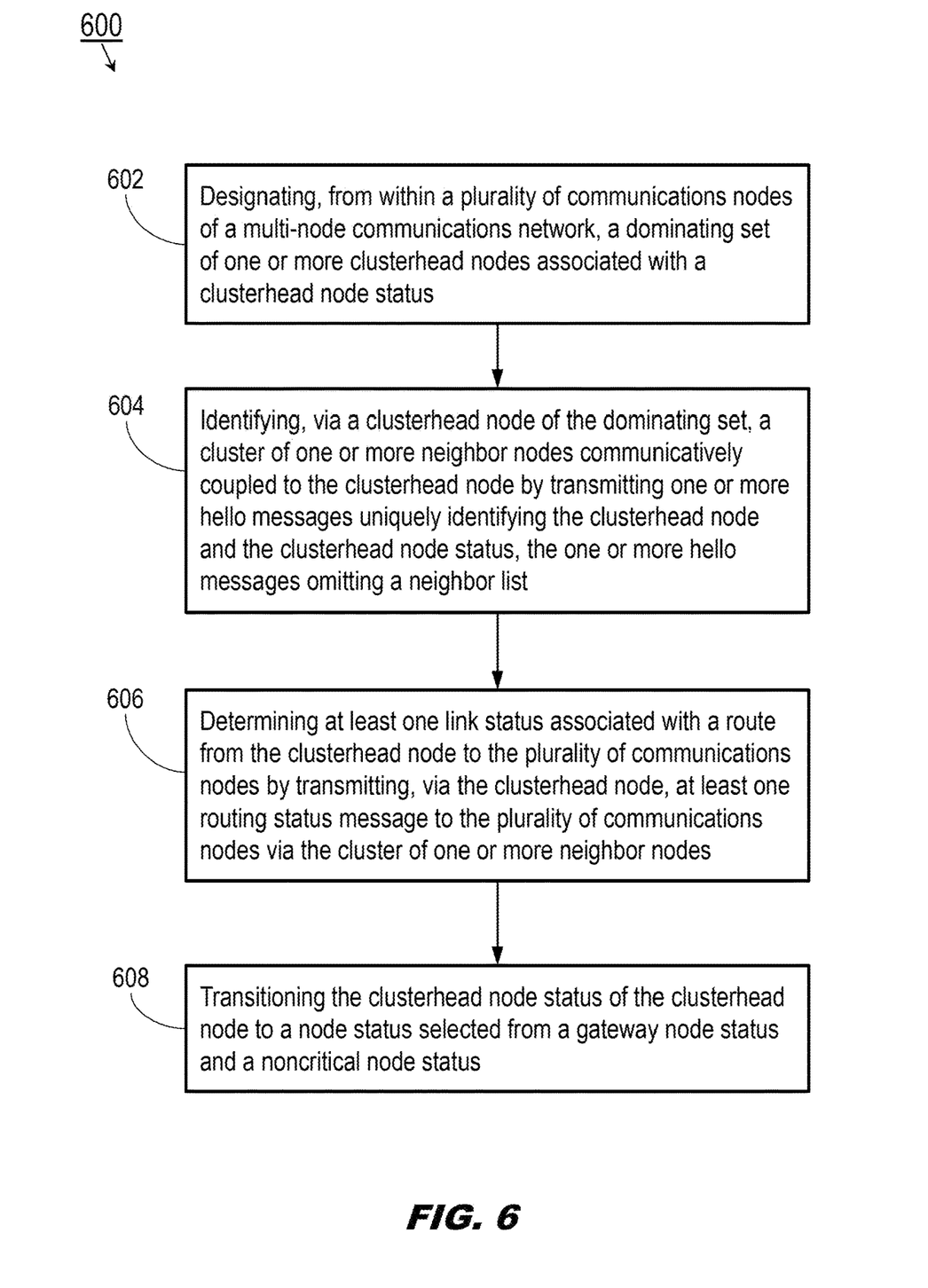
FIG. 6 is a process flow diagram illustrating a method for MANET routing according to with example embodiments of this disclosure.

Referring now to FIG. 6, the method 600 may be implemented by the multi-node communications networks 100, 100*a-c* of FIGS. 1 through 5B and may include the following steps.

At a step 602, a dominating set of clusterhead nodes is designated from within a multi-node communications network. For example, one or more communications nodes may transition to clusterhead node status according to one or more applicable passive clustering schemes or procedures. In some embodiments, the dominating set may be an independent dominating set (IDS), or the minimal dominating set (e.g., the dominating set having the minimally necessary number of clusterhead nodes).

At a step 604, each clusterhead node identifies a cluster of neighbor nodes in communication with the clusterhead node by transmitting adaptive hello messages identifying the clusterhead node as well as its clusterhead node status. For example, the clusterhead nodes may transmit adaptive hello messages not including a local neighbor list.

At a step 606, each clusterhead node determines a link status with respect to the other communications nodes of the multi-node communications network by transmitting routing status messages to its neighbor nodes. For example, the clusterhead nodes may flood the network with routing status messages according to one or more packet flooding schemes or procedures. Further, the routing status messages may include, but are not limited to, link status advertisements (LSA) comprising link status information of the clusterhead node and its neighbor nodes, or distance vector distribution (DVD) messages incorporating link information for every communications node of the multi-node communications network.

The method 600 may include an additional step 608. At the step 608, the clusterhead node transitions its node status to that of a gateway node or an ordinary node. For example, the clusterhead node (and any other node within the multi-node communications network) may transition in status based on data packets received from other nodes and/or node status transitions of neighbor nodes (e.g., as provided for by received hello messages or routing status messages), e.g., according to one or more passive clustering schemes.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A communications node of a multi-node communications network, the communications node comprising:
   a communications interface;
   and
   a controller communicatively coupled to the communications interface, the controller configured to:
   designate a clustering status of the communications node as a clusterhead node status;
   identify a cluster of one or more neighbor communications nodes communicatively coupled with the communications node by transmitting, via the communications interface, one or more hello messages, each hello message including 1) a unique node identifier corresponding to the communications node and 2) the clustering status;
   determining at least one routing status associated with a route from the communications node to one or more additional communications nodes of the multi-node communications network by transmitting, via the communications interface, at least one routing status message to the one or more additional communications nodes via the cluster of one or more neighbor communications nodes.

2. The communications node of claim 1, wherein:
   the communications node has an initial clustering status selected from the clusterhead node status, a gateway node status, a noncritical node status, and a clusterhead-ready node status;
   and
   the controller is configured to designate the clustering status of the communications node as a clusterhead node status by transitioning the clustering status from the initial clustering status.

3. The communications node of claim 1, wherein the controller is configured to designate the clustering status of the communications node as a node status selected from:
   a gateway node status;
   and
   a noncritical node status.

4. The communications node of claim 3, wherein the controller is configured to designate the clustering status of the communications node based on one or more passive clustering procedures.

5. The communications node of claim 1, wherein the controller is configured to transmit the one or more hello messages to the one or more additional communications nodes according to one or more packet broadcasting procedures.

6. The communications node of claim 1, wherein each hello message indicates only the communications node via the unique node identifier and excludes a local list of one or more neighbors communicatively coupled with the communications node.

7. The communications node of claim 1, wherein the at least one routing status message is selected from:
   a link status advertisement (LSA) including link information associated with the one or more neighbor communications nodes;
   and
   a distance vector distribution (DVD) message according to one or more routing protocols, the DVD message including link information associated with the one or more additional communications nodes.

8. A method for independent dominating set (IDS) based ad hoc network routing within a set of communications nodes, comprising:
   designating, from within a plurality of communications nodes of a multi-node communications network, a dominating set of one or more clusterhead nodes associated with a clusterhead node status;
   identifying, via a clusterhead node of the dominating set, a cluster of one or more neighbor nodes communicatively coupled to the clusterhead node by transmitting one or more hello messages uniquely identifying the clusterhead node and the clusterhead node status, the one or more hello messages omitting a neighbor list;
   determining at least one link status associated with a route from the clusterhead node to the plurality of communications nodes by transmitting, via the clusterhead node, at least one routing status message to the plurality of communications nodes via the cluster of one or more neighbor nodes.

9. The method of claim 8, wherein designating, from within a plurality of communications nodes of a multi-node communications network, an independent dominating set of one or more clusterhead nodes associated with a clusterhead node status includes:

transitioning a node status of the clusterhead node to the clusterhead node status from an initial node status selected from a gateway node status and a noncritical node status.

10. The method of claim 8, wherein designating, from within a plurality of communications nodes of a multi-node communications network, a dominating set of one or more clusterhead nodes associated with a clusterhead node status includes:

transitioning a node status of at least one communications node to the clusterhead node status according to one or more passive clustering procedures.

11. The method of claim 8, wherein determining at least one link status associated with a route from the clusterhead node to the plurality of communications nodes by transmitting, via the clusterhead node, at least one routing status message to the plurality of communications nodes via the cluster of one or more neighbor nodes includes:

transmitting, via the clusterhead node, at least one routing status message to the plurality of communications nodes via the cluster of one or more neighbor nodes according to one or more packet broadcasting procedures.

12. The method of claim 8, wherein determining at least one link status associated with a route from the clusterhead node to the plurality of communications nodes by transmitting, via the clusterhead node, at least one routing status message to the plurality of communications nodes via the cluster of one or more neighbor nodes includes:

transmitting, via the clusterhead node, at least one link status advertisement (LSA) to the plurality of communications nodes via the cluster of one or more neighbor nodes, the LSA including link information associated with the cluster of one or more neighbor nodes.

13. The method of claim 8, wherein determining at least one link status associated with a route from the clusterhead node to the plurality of communications nodes by transmitting, via the clusterhead node, at least one routing status message to the plurality of communications nodes via the cluster of one or more neighbor nodes includes:

transmitting, via the clusterhead node, at least one distance vector distribution (DVD) message according to one or more routing protocols, the DVD message including link information associated with each of the plurality of communications nodes.

14. The method of claim 8, further comprising:

transitioning the clusterhead node status of the clusterhead node to a node status selected from a gateway node status and a noncritical node status.

\* \* \* \* \*